(12) United States Patent
Egolf et al.

(10) Patent No.: US 6,449,613 B1
(45) Date of Patent: Sep. 10, 2002

(54) METHOD AND DATA PROCESSING SYSTEM FOR HASHING DATABASE RECORD KEYS IN A DISCONTINUOUS HASH TABLE

(75) Inventors: Jared A. Egolf; David A. Egolf, both of Glendale, AZ (US)

(73) Assignee: Bull HN Information Systems Inc., Billerica, MA (US)

( * ) Notice: Subject to any disclaimer, the term of this patent is extended or adjusted under 35 U.S.C. 154(b) by 0 days.

(21) Appl. No.: 09/470,698

(22) Filed: Dec. 23, 1999

(51) Int. Cl.[7] ................................................ G06F 17/30
(52) U.S. Cl. ........................ 707/7; 707/6; 707/200; 707/205
(58) Field of Search ............................ 707/6, 7, 1, 200, 707/205

(56) References Cited

U.S. PATENT DOCUMENTS

| | | | |
|---|---|---|---|
| 5,579,501 A | | 11/1996 | Lipton et al. .................. 711/216 |
| 5,893,086 A | * | 4/1999 | Schmuck et al. ................ 707/1 |
| 5,940,838 A | * | 8/1999 | Schmuck et al. ............. 707/200 |
| 6,023,706 A | * | 2/2000 | Schmuck et al. ............. 707/200 |

OTHER PUBLICATIONS

"Algorithms", 12th Printing Author: Cormen, Leiserson & Rivest, c 1994McGraw–Hill Book Co.
"Fundamentals of Database Systems", 2nd Edition Author: Elmasri/Navathe, c1994 The Benjamin/Cummings Publishin Co.

* cited by examiner

Primary Examiner—Diane D. Mizrahi
(74) Attorney, Agent, or Firm—Faith F. Driscoll; Bruce E. Hayden; James H. Phillips

(57) ABSTRACT

A method of addressing mass storage memory in which information is stored in Space Control Pages of physically contiguous disk segments subject to irregularities in the mapping is disclosed. Space Control Pages fall at regular intervals across the address space. An efficient hashing method is disclosed that first hashes record keys across the entire address space to form a hash index. If the hash index falls into one of the Space Control Pages, the key is rehashed across the contiguous hash space following the Space. Control Page utilizing a second hash function. The result of the second hash function is added to the start of the contiguous hash space following the Space Control Page to generate the hash index utilized for those records that initially hashed into a Space Control Page. In all cases the generated hash index is utilized to store and retrieve records in a database or hash file.

20 Claims, 2 Drawing Sheets

METHOD AND DATA PROCESSING SYSTEM FOR HASHING DATABASE RECORD KEYS IN A DISCONTINUOUS HASH TABLE

FIELD OF THE INVENTION

The present invention generally relates to the art of data storage and retrieval, and more specifically to a physical address on a storage medium during such storage and retrieval.

BACKGROUND OF THE INVENTION

One well known type of data organization and access method for rapidly accessing data stored in main memory or in a file is "Hashing". It is in particular used heavily in database systems to efficiently access records. It operates by extracting one or more fields, usually from the record, to form a "Hash Key". Then, a function ("Hash Function") is applied to the hash key to identify a "Hash Bucket". If "K" represents the Hash Key, "F" represents the "Hash Function, and "B" represents a Hash Bucket, then B=F(K).

The physical disk sectors of Database files are typically grouped together in Pages. Physical and logical references to these files are done by accessing these Pages. Databases which are accessed via a Hash function have zero, one, or more Hash Buckets associated with each Page which holds data. The methods proposed by this invention can be extended to cover the cases other than one Hash Bucket per page.

At its simplest, especially when utilizing hashing in main memory, a contiguous series of Hash Buckets or Hash Entries form a Hash Array, with the Hash Bucket number or Hash Table Index computed by applying the Hash Function to the Hash Key being used to index into the Hash Array.

The problem is a little more complex when dealing with databases and hash files. In those instances, each Hash Bucket can typically contain multiple records, and Hash Buckets are organized into a Hash Table. In order to determine whether a record with a specified Hash Key exists in a database or hash structure, the corresponding Hash Bucket can be computed by applying the Hash Function to the Hash Key for the record. Then, the Hash Bucket is searched for the record containing that Hash Key.

A problem arises however when an entry in a Hash Array or a Hash Bucket fills up. When a subsequent record hashes to the same Hash Entry or Hash Bucket, you get what is termed a "Collision". A number of different algorithms have been developed to address this Collision problem. For example, overflow pages or blocks can be chained to the Hash Bucket. Alternatively, the record can be stored in the next available Hash Bucket that has room. Then, when searching for a record with a given Hash Key, the search starts at the Hash Entry or Hash Bucket addressed by the Hash Function applied to the relevant Hash Key. The search progresses through the Hash Table, and ends in failure when a record is not found in a Hash Entry or Hash Bucket that is not full.

This later method works well in situations, such as compiler symbol tables, where there are insertions into a Hash Table, but not deletions. It fails however when there are deletions, as in the typical database, since deletions create holes, which could prematurely terminate the search for a matching Hash Key in failure.

Another problem that arises in Hashing when dealing with databases and files is when a Hash Table contains discontiguous blocks of Hash Buckets. There may be some pages uniformly dispersed throughout the hash table that may not be capable of containing data records or Hash Buckets. This can happen when, for example, space control information for managing the file content is located on pages spread uniformly through the file. These pages will be referred to as Space Control Pages for the purposes of this disclosure. This application is related to our copending patent applications assigned to the assignee hereof.

There is a related problem when the Hash Buckets do not start at the first of the space used for hashing. The problem is that Hash Functions typically generate a continuous range of Hash Bucket number. For example, if the Hash Function involves dividing the Hash Key by a specified prime number, and using the remainder as the Hash Bucket number, then the resulting Hash Bucket numbers will typically comprise all of the integers between 0 and Prime−1. However, information containers such as files typically contain header information which takes pages at the beginning of the file.

The problem that arises here is that when the Hash Table contains holes (and thus discontiguous blocks of Hash Buckets), including a hole at the beginning, the situation must be handled when a Hash Key hashes to one of the holes. The typical overflow procedure of going to the next open Hash Bucket is suboptimal. This suboptimality results in reduced performance. One reason for this suboptimality is that the next Hash Bucket after each hole would become overloaded with hash entries, since that Hash Bucket must not only support and contain the records containing Hash Keys that hash to that Hash Bucket, but also all of those in the preceding hole. The bigger the "hole" in the Hash Table, the worse the problem. For example, if a Space Control Page is the same size as a Hash Bucket, then the next Hash Bucket after such a Space Control Page would fill up twice as fast as the other Hash Buckets using such an overflow procedure. Similarly, if a Space Control Page is twice the size of a Hash Bucket, then the next Hash Bucket after such a Space Control Page would fill up three times as fast as the other Hash Buckets using such an overflow procedure.

One solution to these problems is found in U.S. Pat. No. 5,579,501, incorporated by reference herein. The solution embodied in that patent allows the direct computation of the table page which contains the hash bucket. It performed this computation using integer arithmetic and involves several computational steps. The present invention involves fewer computational steps in all cases.

BRIEF DESCRIPTION OF THE DRAWINGS

The features and advantages of the present invention will be more clearly understood from the following detailed description taken in conjunction with the accompanying FIGURES where like numerals refer to like and corresponding parts and in which.

DETAILED DESCRIPTION

A method of addressing mass storage memory in which information is stored in Pages of physically contiguous disk segments subject to irregularities in the mapping is disclosed. Space Control Pages fall at regular intervals across the address space. An efficient hashing method is disclosed that first hashes record keys across the entire address space to form a hash index. If the hash index falls into one of the Space Control Pages, the key is rehashed across the contiguous hash space following the Space Control Page utilizing a second hash function. The result of the second hash function is added to the start of the contiguous hash space following the Space Control Page to generate the hash index utilized for those records that initially hashed into a Space Control Page. In all cases the generated hash index is utilized to store and retrieve records in a database or hash file.

Figure 1:
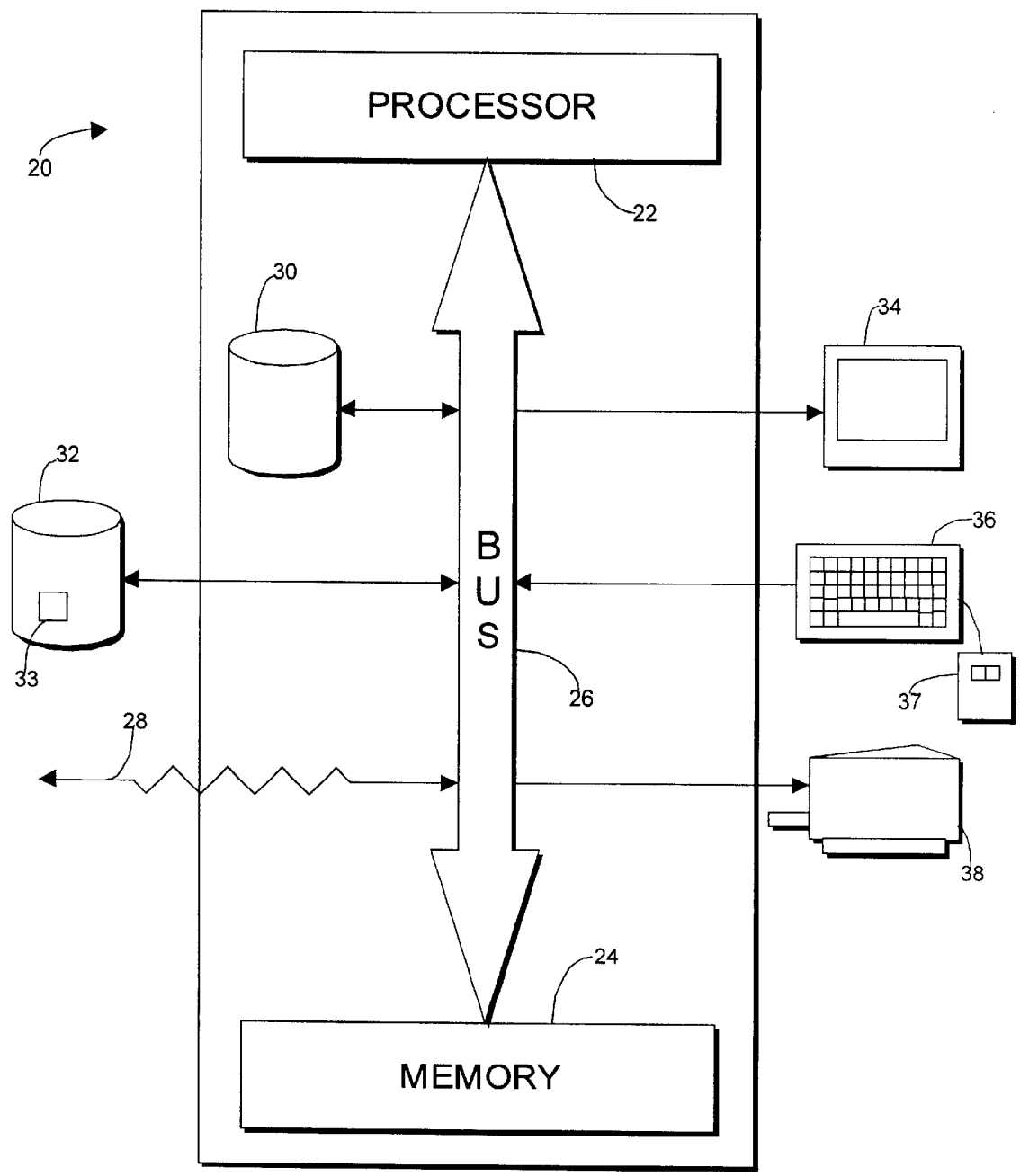
FIG. 1 is a block diagram illustrating a General Purpose Computer, in accordance with the present invention.

FIG. 1 is a block diagram illustrating a General Purpose Computer 20. The General Purpose Computer 20 has a Computer Processor 22, and Memory 24, connected by a Bus 26. Memory 24 is a relatively high speed machine readable medium and includes Volatile Memories such as DRAM, and SRAM, and Non-Volatile Memories such as, ROM, FLASH, EPROM, EEPROM, and bubble memory. Also connected to the Bus are Secondary Storage 30, External Storage 32, output devices such as a monitor 34, input devices such as a keyboard 36 (with mouse 37), and printers 38. Secondary Storage 30 includes machine-readable media such as hard disk drives, magnetic drum, and bubble memory. External Storage 32 includes machine-readable media such as floppy disks, removable hard drives, magnetic tape, CD-ROM, and even other computers, possibly connected via a communications line 28. The distinction drawn here between Secondary Storage 30 and External Storage 32 is primarily for convenience in describing the invention. As such, it should be appreciated that there is substantial functional overlap between these elements. Computer software such as data base management software, operating systems, and user programs can be stored in a Computer Software Storage Medium, such as memory 24, Secondary Storage 30, and External Storage 32. Executable versions of computer software 33, can be read from a Non-Volatile Storage Medium such as External Storage 32, Secondary Storage 30, and Non-Volatile Memory and loaded for execution directly into Volatile Memory, executed directly out of Non-Volatile Memory, or stored on the Secondary Storage 30 prior to loading into Volatile Memory for execution.

Figure 2:
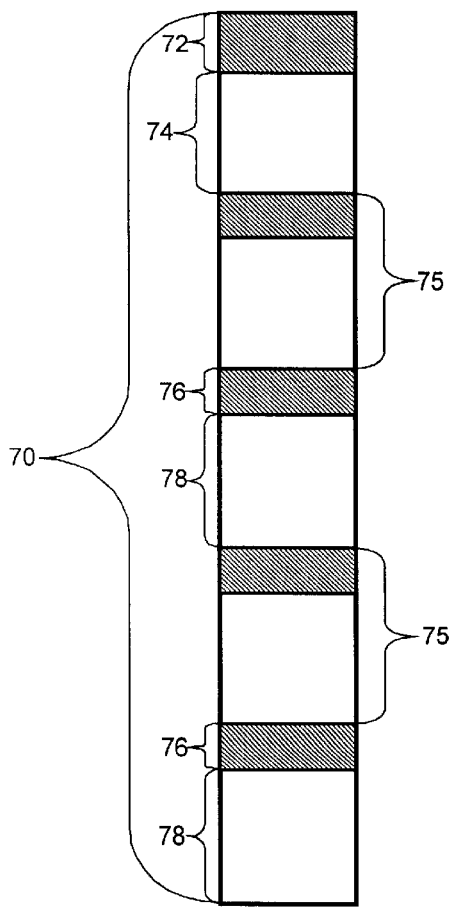
FIG. 2 is a diagram illustrating a Hash Table, in accordance with the present invention.

FIG. 2 is a diagram illustrating a Hash Table, in accordance with the present invention. When implemented as a database or in a file system, the Hash Table corresponds to either an entire file, or the portion of the file that does not include overflow pages. The Hash Table 70 consists of several different types of information. The Hash Table 70 is broken into large Hash Table blocks 75. At the top of the Hash Table 70 is header control information 72. This header control information 72 is used to control allocation and access to the Hash Table 70. For example, it may contain hash control information such as hash function values, links to overflow pages, and the sizes of the various parts of the Hash Table 70 and Hash file. This header control information 72 also includes a Space Control Page which holds housekeeping information for this first Hash Table Block. The remainder of the first Hash Table block 75 is a first data area 74 containing Hash Buckets. This first Hash Table block 75 is followed by other Hash Table blocks 75. At the beginning of each of the subsequent Hash Table blocks 75, is a Space Control Page 76. A Space Control Page stores housekeeping information for that Hash Table block 75 such as memory allocation information. In each of these subsequent Hash Table blocks 75, the control information 76 is followed by a hash data area 78 containing Hash Buckets. The control information 72, 76 portions of the Hash Table 70 are shown cross-hatched to indicate that they contain control information and not Hash Buckets. The control information 72, 76 areas of the Hash Table 70 will be hereinafter referred to as "header control information" and "Space Control Pages", respectively.

The problem addressed by this invention arises because a Hash Function applied to a Hash Key that distributes Hash entries across the entire Hash Table 70 will result in some valid Hash Keys hashing to the header control information and Space Control Pages 72, 76 in the Hash Table 70. The problem caused by the Space Control Pages is more of interest since they cause the holes which are uniformly distributed throughout the Hash Table 70.

Figure 3:
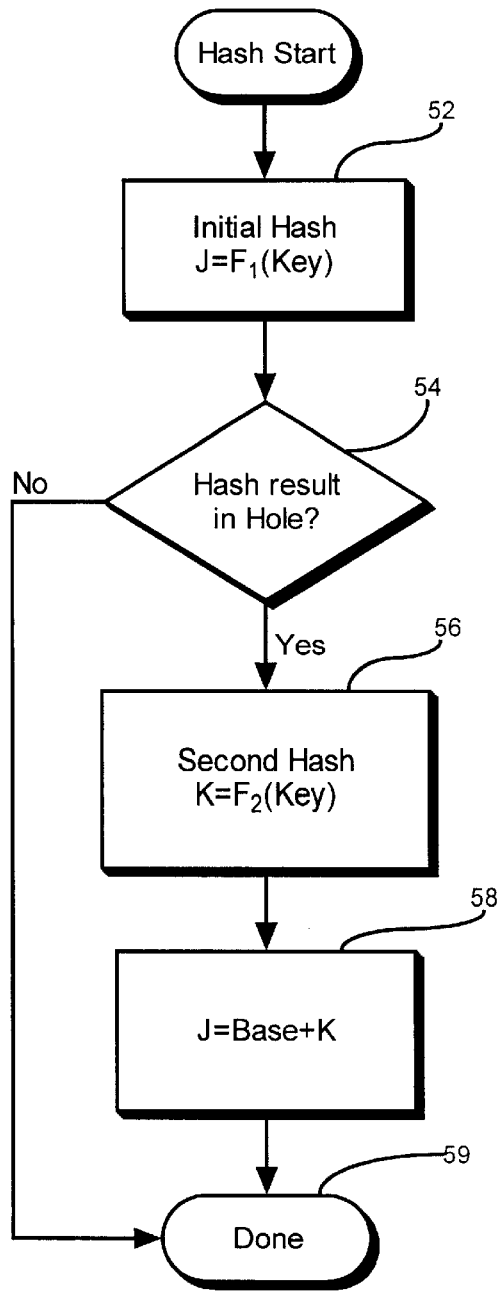
FIG. 3 is a flowchart illustrating a method of efficiently hashing into a Hash Table that includes Space Control Pages, in accordance with a preferred embodiment of the present invention.

FIG. 3 is a flowchart illustrating a method of efficiently hashing into a Hash Table 70 that includes Space Control Pages 72, 76, in accordance with a preferred embodiment of the present invention. After a record key is generated for a record, it is initially hashed by a first hash function (J=$F_1$(Key)) which distributes hash entries into Hash Buckets across the entire Hash Table 70, step 52. A test is then made whether the generated Hash Table 70 index (J) falls within the header control information or a Space Control Page 72, 76, step 54. If the Hash Table 70 index (J) does not fall within a Space Control Page 72, 76, step 54, that Hash Table 70 index (J) is utilized, and the method is complete, step 59. Otherwise, a second hash function is applied to the hash key (K=$F_2$(Key)) that distributes the secondary Hash Table 70 index (K) across the Hash Buckets in the data areas 74, 78 following the Space Control Page 72, 76 into which the originally computed Hash Table 70 index (J) fell, step 56. The secondary Hash Table index (K) is then added to the base of the data area 74, 78 following that Space Control Page 72, 76 to form a revised Hash Table index (J=Base+K), step 58. This revised Hash Table index (J) is then utilized to index into and identify a Hash Bucket in the Hash Table 70, and the method is complete, step 59.

The goal of a good hashing function is to distribute records uniformly over the address space so as to minimize collisions while not leaving many unused locations. One of the typical hash functions ($F_1$, $F_2$) is the use of integral modular division. The remainder of a division of a Hash Key by a specified divisor is utilized as the hash function ($F_1$, $F_2$) result. Thus, $F(K)=K-(INT(K/D)*D)$, where D is the specified Divisor. Experience has shown that in many cases, if the Divisor (D) is prime, such a hash function will do a fairly good job of distributing hash entries across the interval of 0 through D−1.

In the preferred embodiment, the Divisor ($D_1$) for the first hash function ($F_1$) is a prime number slightly smaller than the entire size of the Hash Table 70. The Divisor ($D_2$) for the second hash function ($F_2$) for rehashing the hash key across the data area 78 following a subsequent Space Control Page 76 is preferably 511. While 511 is not prime, as it is product of 7*73, its two factors are prime, and thus does a good job at distributing keys initially hashing to a subsequent Space Control Page 76 across its data area 78. Alternatively, other Divisors ($D_2$) may be utilized. For example, a divisor ($D_2$) for the second has function ($F_2$) of 509 is prime. This divisor also does a good job, since only two of the 511 Hash Table Buckets are given up using this divisor. An additional advantage of the use of 509 as a divisor is that in the preferred embodiment the first data area 74 of the first hash block contains only 510 pages eligible for hash buckets. By using 509 as the secondary divisor throughout the Hash Table, the first hash block is less of a special case.

The disclosed invention efficiently hashes record keys across a hash space containing discontinuities or holes that are uniformly distributed across the hash address space. In most cases (in the preferred embodiment, about 99.8% of the time), a single hash ($F_1$) is utilized. This requires a single division when a modular division hash function ($F_1$) is utilized. Detection of subsequent holes can be efficiently done when the Hash Table blocks 75 contain a power of 2 ($2^n$) Pages, such as 512 ($2^9$) by a simple masking operation on the initially computed Hash index (J). Initial Hash index (J) values falling into the initial header control information 72 can be efficiently identified by comparing the hash index (J) against the size of the initial header control information 72. Only when the initial Hash index (J) falls into the header control information 72 or a Space Control Page 76, which in the preferred embodiment is approximately 0.2% of the time, is it necessary to apply a second hash function ($F_2$), which in this case necessitates a second division operation.

Those skilled in the art will recognize that modifications and variations can be made without departing from the spirit of the invention. Therefore, it is intended that this invention encompass all such variations and modifications as fall within the scope of the appended claims.

Claim elements and steps herein have been numbered and/or lettered solely as an aid in readability and understanding. As such, the numbering and/or lettering in itself is not intended to and should not be taken to indicate the ordering of elements and/or steps in the claims.

What is claimed is:

1. A method of hashing a hash key into a hash table containing a set of holes uniformly distributed across the hash table to generate a hash table index used to index a hash bucket in the hash table, wherein:

each of the set of holes in the hash table is followed by a contiguous region of hash buckets in the hash table;

the method comprises;

A) applying a first hash function to the hash key to generate a first hash index, wherein:
      the first hash function maps the hash key across the hash table containing the set of holes;
   B) testing whether the first hash index falls within a one of the set of holes in the hash table;
   C) applying a second hash function to the hash key to generate a second hash index when the first hash index falls within the one of the set of holes in the hash table, wherein:
      the second hash function maps the hash key into the contiguous region of hash buckets following the one of the set of holes in the hash table; and
   D) utilizing the first hash index as the hash table index when the first hash index does not fall within a one of the set of holes, and utilizing the second hash index as the hash table index when the first hash index does fall within a one of the set of holes.

2. The method in claim 1 wherein:
   the set of holes in the hash table comprises Space Control Pages.

3. The method in claim 1 wherein:
   the second hash function comprises performing modular division on the hash key with the modulus being a second integer divisor less than or equal to the number of hash buckets in the contiguous region of hash buckets following the one of the set of holes in the hash table.

4. The method in claim 3 wherein:
   the second integer divisor is equal to 511.

5. The method in claim 3 wherein:
   the second integer divisor is equal to 509.

6. The method in claim 1 wherein:
   the first hash function comprises performing modular division on the hash key with the modulus being a first integer divisor greater than the number of hash buckets in the hash table.

7. The method in claim 1 wherein:
   step (B) comprises:
   1) logically masking a set of bits in the first hash table index to determine whether the first hash index falls within the one of the set of holes in the hash table.

8. The method in claim 1 wherein:
   step (B) comprises:
   1) comparing the first hash table index against a specified constant to determine whether the first hash index falls within the one of the set of holes in the hash table.

9. The method in claim 1 which further comprises:
   E) utilizing the hash table index to store a record in a database.

10. The method in claim 1 wherein:
    the first hash function comprises performing modular division on the hash key with the modulus being a first integer divisor greater than the number of hash buckets in the hash table;

the second hash function comprises performing modular division on the hash key with the modulus being a second integer divisor less than or equal to the number of hash buckets in the contiguous region of hash buckets following the one of the set of holes in the hash table; and step (B) comprises:
    1) logically masking a set of bits in the first hash table index to determine whether the first hash index falls within the one of the set of holes in the hash table, and
    2) comparing the first hash table index against a specified constant to determine whether the first hash index falls within the one of the set of holes in the hash table.

11. A data processing system containing a database management software system that provides improved hashing of a hash key into a hash table stored in a memory in the data processing system, wherein:

said hash table contains a set of holes uniformly distributed across the hash table;

each of the set of holes in the hash table is followed by a contiguous region of hash buckets in the hash table; and the database management software system generates a hash table index used to index a hash bucket in the hash table and comprises; and the database management software system comprises:

A) a set of computer instructions stored in a Computer Software Storage Medium for applying a first hash function to the hash key to generate a first hash index, wherein:
       the first hash function maps the hash key across the hash table containing the set of holes;
    B) a set of computer instructions stored in the Computer Software Storage Medium for testing whether the first hash index falls within a one of the set of holes in the hash table;

C) a set of computer instructions stored in the Computer Software Storage Medium for applying a second hash function to the hash key to generate a second hash index when the first hash index falls within the one of the set of holes in the hash table, wherein:
the second hash function maps the hash key into the contiguous region of hash buckets following the one of the set of holes in the hash table; and
D) a set of computer instructions stored in the Computer Software Storage Medium for utilizing the first hash index as the hash table index when the first hash index does not fall within a one of the set of holes, and utilizing the second hash index as the hash table index when the first hash index does fall within a one of the set of holes.

12. The data processing system in claim 11 wherein:
the set of holes in the hash table comprises Space Control Pages.

13. The data processing system in claim 11 wherein:
the second hash function comprises performing modular division on the hash key with the modulus being a second integer divisor less than or equal to the number of hash buckets in the contiguous region of hash buckets following the one of the set of holes in the hash table.

14. The data processing system in claim 11 wherein:
the first hash function comprises performing modular division on the hash key with the modulus being a first integer divisor greater than the number of hash buckets in the hash table.

15. The data processing system in claim 11 wherein:
set of computer instructions (B) comprises:
1) a set of computer instructions for logically masking a set of bits in the first hash table index to determine whether the first hash index falls within the one of the set of holes in the hash table.

16. The data processing system in claim 11 wherein:
set of computer instructions (B) comprises:
1) a set of computer instructions for comparing the first hash table index against a specified constant to determine whether the first hash index falls within the one of the set of holes in the hash table.

17. The data processing system in claim 11 wherein the database access optimization engine further comprises:
E) a set of computer instructions stored in the Computer Software Storage Medium for utilizing the hash table index to store a record in a database.

18. The data processing system in claim 11 wherein:
the first hash function comprises performing modular division on the hash key with the modulus being a first integer divisor greater than the number of hash buckets in the hash table;
the second hash function comprises performing modular division on the hash key with the modulus being a second integer divisor less than or equal to the number of hash buckets in the contiguous region of hash buckets following the one of the set of holes in the hash table; and
set of computer instructions (B) comprises:
1) a set of computer instructions for logically masking a set of bits in the first hash table index to determine whether the first hash index falls within the one of the set of holes in the hash table, and
2) a set of computer instructions for comparing the first hash table index against a specified constant to determine whether the first hash index falls within the one of the set of holes in the hash table.

19. A database management software system for execution on a data processing system that provides improved hashing of a hash key into a hash table, wherein:
the hash table contains a set of holes uniformly distributed across the hash table;
each of the set of holes in the hash table is followed by a contiguous region of hash buckets in the hash table; and
the database access optimization engine generates a hash table index used to index a hash bucket in the hash table and comprises; and
the database management software system comprises:
A) a set of computer instructions stored in a Computer Software Storage Medium for applying a first hash function to the hash key to generate a first hash index, wherein:
the first hash function maps the hash key across the hash table containing the set of holes,
B) a set of computer instructions stored in the Computer Software Storage Medium for testing whether the first hash index falls within a one of the set of holes in the hash table;
C) a set of computer instructions stored in the Computer Software Storage Medium for applying a second hash function to the hash key to generate a second hash index when the first hash index falls within the one of the set of holes in the hash table, wherein:
the second hash function maps the hash key into the contiguous region of hash buckets following the one of the set of holes in the hash table; and
D) a set of computer instructions stored in the Computer Software Storage Medium for utilizing the first hash index as the hash table index when the first hash index does not fall within a one of the set of holes, and utilizing the second hash index as the hash table index when the first hash index does fall within a one of the set of holes.

20. A computer readable Non-Volatile Storage Medium encoded with a set of computer instructions for a database management software system for execution on a data processing system that provides improved hashing of a hash key into a hash table, wherein:
the hash table contains a set of holes uniformly distributed across the hash table;
each of the set of holes in the hash table is followed by a contiguous region of hash buckets in the hash table; and
the database access optimization engine generates a hash table index used to index a hash bucket in the hash table and comprises; and
the database management software system comprises:
A) a set of computer instructions for applying a first hash function to the hash key to generate a first hash index, wherein:
the first hash function maps the hash key across the hash table containing the set of holes;
B) a set of computer instructions for testing whether the first hash index falls within a one of the set of holes in the hash table;
C) a set of computer instructions for applying a second hash function to the hash key to generate a second hash index when the first hash index falls within the one of the set of holes in the hash table, wherein:
the second hash function maps the hash key into the contiguous region of hash buckets following the one of the set of holes in the hash table; and D) a set of computer instructions for utilizing the first hash index as the hash table index when the first hash index does not fall within a one of the set of holes, and utilizing the second hash index as the hash table index when the first hash index does fall within a one of the set of holes.

\* \* \* \* \*